(12) United States Patent
Malas et al.

(10) Patent No.: US 8,893,748 B2
(45) Date of Patent: Nov. 25, 2014

(54) PIPELINE FOR HIGH PRESSURE CRYOGENIC APPLICATIONS

(71) Applicants: Akin Malas, Karlsfeld (DE); Andreas Walz, Wolfratshausen (DE)

(72) Inventors: Akin Malas, Karlsfeld (DE); Andreas Walz, Wolfratshausen (DE)

(73) Assignee: Linde Aktiengesellschaft, Munich (DE)

( * ) Notice: Subject to any disclaimer, the term of this patent is extended or adjusted under 35 U.S.C. 154(b) by 237 days.

(21) Appl. No.: 13/677,476

(22) Filed: Nov. 15, 2012

(65) Prior Publication Data
US 2014/0124077 A1    May 8, 2014

Related U.S. Application Data
(60) Provisional application No. 61/723,905, filed on Nov. 8, 2012.

(51) Int. Cl.
*F16L 9/18* (2006.01)
*F16L 9/19* (2006.01)
*F16L 59/14* (2006.01)
*F16L 9/14* (2006.01)
*F17D 1/08* (2006.01)

(52) U.S. Cl.
CPC .............. *F16L 9/19* (2013.01); *F16L 59/141* (2013.01); *F16L 9/14* (2013.01); *F17D 1/082* (2013.01)
USPC .......................................... 138/114; 138/148

(58) Field of Classification Search
CPC ............. F16L 59/141; F16L 9/19; F16L 9/14; F17D 1/082
USPC .................... 138/111–117, 140–151
See application file for complete search history.

(56) References Cited

U.S. PATENT DOCUMENTS

| | | | |
|---|---|---|---|
| 3,407,835 A | | 10/1968 | Hans |
| 3,433,028 A | | 3/1969 | Klee |
| 3,674,086 A | | 7/1972 | Foster |
| 3,696,627 A | * | 10/1972 | Longsworth .................. 62/48.1 |
| 3,777,502 A | | 12/1973 | Michie et al. |
| 4,014,369 A | * | 3/1977 | Kobres, Jr. ..................... 138/112 |
| 4,256,170 A | * | 3/1981 | Crump .......................... 165/154 |
| 5,097,898 A | | 3/1992 | Verkaart |
| 5,201,343 A | * | 4/1993 | Zimmermann et al. ........ 138/26 |
| 6,253,855 B1 | | 7/2001 | Johal et al. |
| 2008/0134692 A1 | * | 6/2008 | Crowley ........................ 62/50.7 |

OTHER PUBLICATIONS

European Search Report for EP 13 15 1755 Date of Mailing: Jun. 28, 2013, Authorized Officer: Gerhard Stangl, 6 pp.

* cited by examiner

*Primary Examiner* — Lien Ngo
(74) *Attorney, Agent, or Firm* — Joshua L. Cohen

(57) ABSTRACT

A pipeline apparatus for liquid cryogen includes a first assembly consisting of a first pipe having a first exterior surface and a first passageway for liquid cryogen, and a longitudinal member extending along a portion of the first exterior surface of the first pipe; a second pipe having a second passageway sized and shaped to receive the first assembly therein, the second pipe coacting with the longitudinal member to provide a pair of channels in the second passageway; and a third pipe having a third passageway sized and shaped to receive the second pipe therein, the third pipe spaced apart from the second pipe.

11 Claims, 3 Drawing Sheets

PIPELINE FOR HIGH PRESSURE CRYOGENIC APPLICATIONS

The present embodiments relate to insulated pipeline.

Insulated pipelines are known which may be externally insulated with lagging or vacuum jacketed. When a cryogenic substance is pressurized its temperature increases and, with cryogenics, an increase in temperature is not desirable. For example, liquid nitrogen (LIN) boils at atmospheric pressure (0 barg) 77.347K (−195.83° C.). However, when the pressure of the liquid nitrogen is increased to 30 barg in a pipeline, the boiling temperature of the liquid increases to 126.30° K. (−146.85° C.), an increase of approximately 50° in temperature. This boiling temperature increase of the cryogen causes the cryogen to lose a large portion of its cooling efficiency and increases the risk of evaporation during transportation in the pipeline. Therefore, subcooling the liquid is used to solve the problem but unfortunately, existing pipeline design and construction still permits the liquid cryogen to vaporize after or downstream of the subcooler.

SUMMARY OF THE INVENTION

The present inventive embodiments maintain the liquid cryogen at a temperature as low as possible during transportation or delivery of the cryogen through the pipeline; increase cooling efficiency of the liquid cryogen so that same can be used for impingement cooling applications where high pressure LIN above 3 barg is used; and, when used with a vacuum pump, reduce the cryogenic temperature below temperatures of LIN at −1 barg at 63.148° K. (−210° C.) therefore increasing the LIN efficiency at impingement.

BRIEF DESCRIPTION OF THE DRAWING

For a more complete understanding of the present embodiments, reference may be had to the following description taken in conjunction with the drawing Figures, of which.

DETAILED DESCRIPTION OF THE INVENTION

Figure 1:
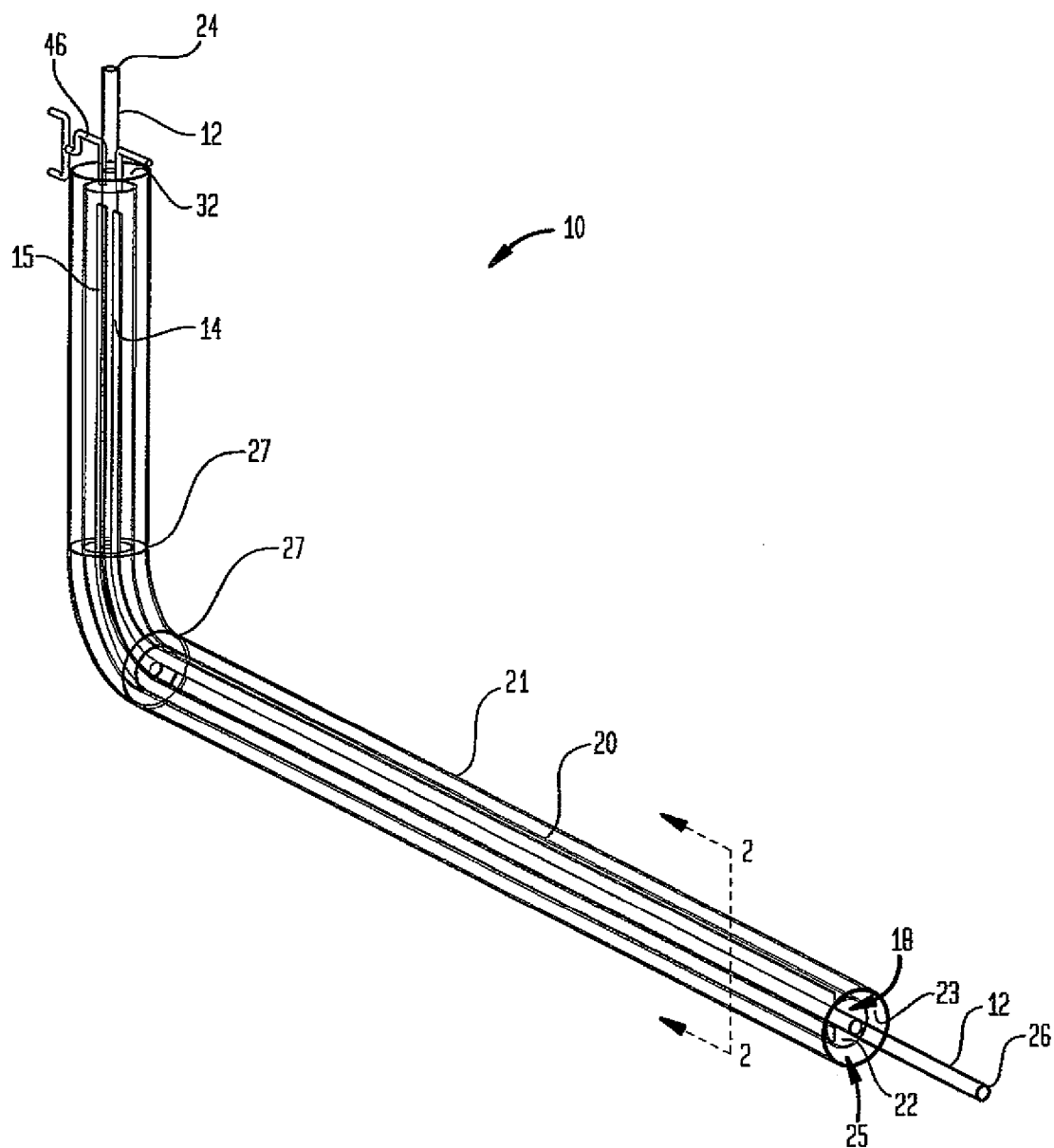
FIG. 1 shows a perspective, transparent view of a cryogenic pipeline embodiment of the present invention.
Figure 2:
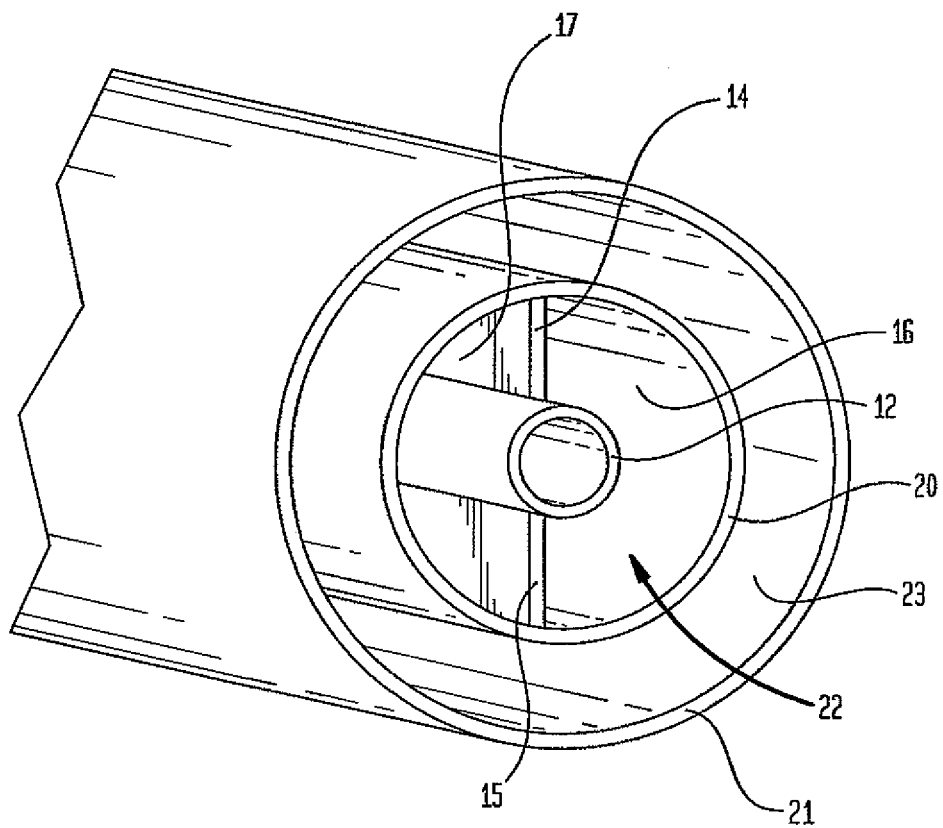
FIG. 2 shows a cross-section of the pipeline embodiment taken along line 2-2 of FIG. 1.
Figure 3:
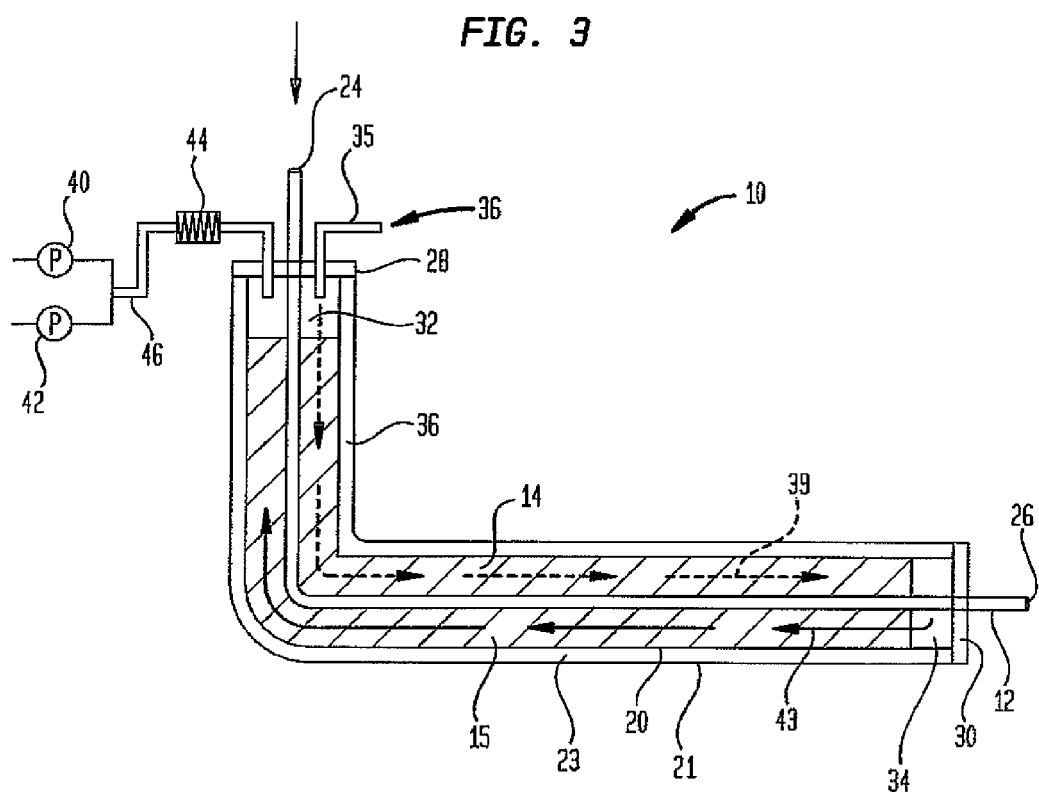
FIG. 3 shows a cross-sectional side view of the cryogenic pipeline embodiment.

Referring to FIGS. 1-3, a pipeline apparatus of the present embodiments is shown generally at 10. The apparatus 10 includes a central pipe 12 through which a liquid cryogen such as for example nitrogen ($N_2$), Hydrogen (H), or Helium (He) will flow. The pipe 12 can be constructed from copper or copper alloy material. By way of example, reference to the cryogen will be liquid nitrogen (LIN), although it is understood that other fluids and other cryogenic liquids can flow through the pipe 12. The central pipe 12 can be of any length and manufactured with turned or bent sections as the application requires.

Copper fins 14,15 or wings are mounted to the central pipe 12. The fins 14,15 can be welded or brazed to an exterior surface of the central pipe 12. The fins 14,15 provide an insulation effect and a pair of passageways 16,17 or channels along an exterior of the central pipe 12. As shown, the fins 14,15 substantially extend along the central pipe 12 parallel to a longitudinal axis of said pipe and therefore the fins essentially conform to the shape of the central pipe. The fins 14,15 can be formed integral with the central pipe 12. The combination of the central pipe 12 and the fins 14,15 provide a first insert 18.

The apparatus 10 includes a tube member 20 having an interior 22 sized and shape to receive the first insert 18. The tube member 20 can be vacuum jacketed or vacuum insulated, and may be formed from stainless steel, copper or other metallic material. The fins 14,15 coact with the tube member 20 to form the passageways 16,17 or channels.

An outer pipe 21 having a shape similar to the central pipe 12 and tube member 20 has a space 23 therein sized and shaped to receive the tube member, as shown for example in FIG. 1. The space 23 provides an insulation effect with air or a vacuum therein. Alternatively foam or other insulation material can fill the space 23 to provide insulation for the first inset 18. The combination of the first inset 18 and the tube member 20 form a second insert 25 which is disposed in the space 23 provided by the outer pipe 21. The outer pipe 21 may be formed from stainless steel, copper or other metallic material.

At least one spacer 27 and depending upon the length of the apparatus and the bends therein, a plurality of said spacers may be used to provide structural support and spatial arrangement between and among the central pipe 12, the tube member 20 and the outer pipe 21. The spacer(s) 27 can be welded into position as shown in FIG. 1.

One end 24 of the central pipe 12 is connected to a source (not shown) of high pressure sub-cooled liquid nitrogen at approximately greater than 3 barg. Another end 26 of the central pipe 12 extends through the end cap 30. The first insert 18 does not consume the entire interior space 22 of the tube 20. That is, end caps 28,30 seal opposed ends of the tube 20, but provide an entry space 32 and a return space 34, respectively at opposed ends of the tube member 20.

A pipe 35 introduces a low pressure liquid nitrogen 36 for sub-cooling and circulation at less than approximately 1 barg to the entry space 32. The liquid nitrogen flows in the passageway 16 along the length of the tube member 20 whereupon it reaches the return space 34 before the end cap 30, at which point the flow turns and proceeds along the passageway 17. The copper fins 14,15 coact to provide the separate passageways 16,17. The flow 43 of the liquid cryogen continues back toward where it was introduced at the entry space 32 to be recirculated again back through the passageway 16. The flow 43 keeps the temperature of the cryogen liquid in the central pipe 12 as low as possible to prevent vaporization of the liquid.

A circulation pump 40 and a vacuum pump 42 are in communication with the entry space 32 through a line 46 or conduit to circulate the low pressure LIN 36 along the fins 14,15. A pressure control unit 44 includes relief valves and a pressure gauge and is disposed for communication with the line 46 for the circulating and vacuum pumps 40,42 respectively. Although the pressure control unit 44 in FIG. 3 is shown used with the line 46 where the low pressure liquid nitrogen 36 is introduced, the pressure control can also be mounted for use at the return space 34. The circulation of the LIN 36 is to increase convection from the cold liquid flow through the tube member 20. It is necessary to only use either the circulation pump 40 or the vacuum pump 42, depending upon temperature regeneration and the cooling medium (cryogen) being used. The setting at the pressure control unit 44 will therefore control and maintain the pressure in the entry space 32. During operation, there will be evaporation of the LIN 36, and any evaporated gas or vapor will have to be released from the apparatus 10 through relief valves at the pressure control unit 44. For the circulation pump 40, a set point at the pressure control unit 44 will determine when relief valves are to be opened to exhaust evaporated gas. For the vacuum pump 42, a set point for the pressure control unit 44 will determine when the pump 42 is to continue to work to release extra pressure created by the evaporation so the set point does not change.

The sub-cooling LIN 36 is circulated over the fins 14,15 in most applications from the uppermost to the lowermost parts of the central pipe 12, and any gas occurring therefrom will be vented through a pressure relief valve operationally associated with the pressure control 44.

As an option, the sub-cooling LIN 36 can be applied under a vacuum to reduce its temperature. A cryogen's boiling point changes with changing pressure, i.e. increasing pressure will therefore increase the boiling temperature of the cryogen. Therefore, reducing the pressure below atmosphere pressure will lead to decreasing the boiling point of the cryogen for subcooling the liquid. Lower temperatures to create a larger difference between the cryogen's boiling temperature and the actual temperature when the cryogen is transported will be required.

Should the pressure of the sub-cooling LIN 36 exceed a pre-determined pressure, said pressure will be released by the pressure control unit 44 and vented external to the apparatus 10.

The present embodiments provide for recycled low pressure liquid (the sub-cooling liquid) to therefore increase the convection of the liquid to correspondingly increase the efficiency of the subcooling. By controlling the pressure of the present embodiments one is able to strictly control the sub-cooling temperatures in the sub-cooling chamber. The sub-cooling liquid can be subjected to a vacuum to provide lower sub-cooling temperatures which would therefore enable more efficient sub-cooled transportation of the cryogens through the pipe. By increasing a surface area of sub-cooler with the fins it is therefore possible to increase the efficiency of the sub-cooling liquid. Finally, the embodiments provide for concurrent sub-cooling and transport of the cryogen.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A pipeline apparatus for liquid cryogen, comprising:
a first assembly including a first pipe having a first exterior surface and a first passageway for liquid cryogen, and a longitudinal member extending along a portion of the first exterior surface of the first pipe;
a second pipe having a second passageway sized and shaped to receive the first assembly therein, the second pipe coasting with the longitudinal member to provide a pair of channels in the second passageway;
a third pipe having a third passageway sized and shaped to receive the second pipe therein, the third pipe spaced apart from the second pipe;
a fourth pipe in communication with the second passageway for providing LIN to said second passageway;
a pressure control in communication with the LIN in the fourth pipe; and
a vacuum pump and a circulation pump operatively connected to the fourth pipe.

2. The pipeline apparatus of claim 1, wherein the longitudinal member comprises a fin-shaped member extending from the portion of the first exterior surface.

3. The pipeline apparatus of claim 2, wherein the fin-shaped member comprises at least two fin-shaped sections extending from different regions of the first exterior surface.

4. The pipeline apparatus of claim 3, wherein the different regions are disposed at the first exterior surface at opposed sides of the first pipe.

5. The pipeline apparatus of claim 2, wherein the longitudinal member comprises a distal end in contact with an inner surface of the second pipe.

6. The pipeline apparatus of claim 1, further comprising insulation disposed in a space between the second and third pipes.

7. The pipeline apparatus of claim 1, wherein the first passageway has a first length and the longitudinal member extends along the portion of the first exterior surface to a length less than the first length.

8. The pipeline apparatus of claim 1, further comprising a first end cap mounted to one end of the third pipe and a second end cap mounted to an opposite end of the third pipe for sealing the second and third passageways.

9. The pipeline apparatus of claim 1, wherein the longitudinal member is formed from copper.

10. The pipeline apparatus of claim 1, wherein the first, second and third pipes are formed from a material selected from the group consisting of stainless steel, and another metallic alloy.

11. The pipeline apparatus of claim 1, wherein a substantial portion of each of the first, second and third pipes are coaxial.

\* \* \* \* \*